US009567085B2

(12) United States Patent
Suzuki et al.

(10) Patent No.: US 9,567,085 B2
(45) Date of Patent: Feb. 14, 2017

(54) DIVIDER UNIT FOR AIRCRAFT PASSENGER SEAT

(71) Applicant: JAMCO Corporation, Mitaka-shi, Tokyo (JP)

(72) Inventors: Michihito Suzuki, Mitaka (JP); Masaji Ozaki, Mitaka (JP)

(73) Assignee: JAMCO CORPORATION, Tokyo (JP)

( * ) Notice: Subject to any disclaimer, the term of this patent is extended or adjusted under 35 U.S.C. 154(b) by 0 days.

(21) Appl. No.: 15/102,219

(22) PCT Filed: Apr. 11, 2014

(86) PCT No.: PCT/JP2014/060525
§ 371 (c)(1),
(2) Date: Jun. 6, 2016

(87) PCT Pub. No.: WO2015/087559
PCT Pub. Date: Jun. 18, 2015

(65) Prior Publication Data
US 2016/0368608 A1  Dec. 22, 2016

(30) Foreign Application Priority Data

Dec. 9, 2013 (JP) .................................. 2013-254187

(51) Int. Cl.
*B64D 13/00* (2006.01)
*B64D 11/06* (2006.01)

(52) U.S. Cl.
CPC ................................. *B64D 11/0606* (2014.12)

(58) Field of Classification Search
CPC ........................ B64D 11/0606; B64D 11/0023
See application file for complete search history.

(56) References Cited

U.S. PATENT DOCUMENTS 7,178,871 B1 * 2/2007 Round ................... B60N 2/242
297/217.3
7,568,759 B2 * 8/2009 Schurg ................... B64D 11/06
297/184.1
(Continued)

FOREIGN PATENT DOCUMENTS

DE      19541567 C1  *  1/1997  ............ B60N 2/242
DE    102008052841    *  5/2010  ............ B64D 11/06
(Continued)

OTHER PUBLICATIONS

International Search Report dated May 20, 2014, issued in counterpart International Application No. PCT/JP2014/060525, w/English translation (4 pages).
(Continued)

*Primary Examiner* — Philip J Bonzell
(74) *Attorney, Agent, or Firm* — Westerman, Hattori, Daniels & Adrian, LLP

(57) ABSTRACT

A divider unit (100) for a passenger seat has a slide rail (120) that is fixed onto a side shell (12) surrounding the seat. A plate-like divider (150) is equipped with two linear guides (170) inserted in the slide rail (120) and slides within the slide rail (120). A stopper (130) attached to a front end of the slide rail (120) has a tapered surface (132), and the divider (150) is stopped when a front end of the divider (150) rides over the tapered surface (132), thereby preventing generation of collision noise.

2 Claims, 8 Drawing Sheets

(56) References Cited

U.S. PATENT DOCUMENTS

| | | | |
|---|---|---|---|
| 9,216,674 B1 * | 12/2015 | Garib | B60N 2/441 |
| 9,266,614 B2 * | 2/2016 | Henshaw | B60N 2/01 |
| 2005/0001098 A1 | 1/2005 | Saint-Jalmes | |
| 2008/0252109 A1 * | 10/2008 | Salzer | B60N 2/46 297/173 |
| 2009/0146005 A1 | 6/2009 | Bettell | |
| 2009/0200422 A1 | 8/2009 | Johnson et al. | |
| 2012/0038587 A1 | 2/2012 | Alford | |

FOREIGN PATENT DOCUMENTS

| | | | |
|---|---|---|---|
| JP | 2005-536390 A | 12/2005 |
| JP | 2008-520480 A | 6/2008 |
| JP | 2011-511739 A | 4/2011 |
| JP | 2012-529677 A | 11/2012 |

OTHER PUBLICATIONS

Written Opinion dated May 20, 2014, issued in counterpart International Application No. PCT/JP2014/060525, w/English translation (6 pages).

Japanese Decision to Grant a Patent dated Mar. 3, 2015, issued in counterpart Japanese Patent Application No. 2013-254187, w/English translation (6 pages).

* cited by examiner

DIVIDER UNIT FOR AIRCRAFT PASSENGER SEAT

TECHNICAL FIELD

The present invention relates to a partition plate unit called a divider that is provided, for example, on a business class seat (passenger seat) arranged in a passenger cabin of an aircraft.

BACKGROUND ART

Some business class seats have two reclining seats respectively stored inside an enclosure called a shell, and arranged side by side.

In this type of seats, a divider moved in sliding motion has been disposed between the adjacent seats, with the aim to improve the privacy of the passengers.

CITATION LIST

Patent Literature

[PTL 1] Japanese Translation of PCT International Application Publication No 2005-536390
[PTL 2] Japanese Translation of PCT International Application Publication No 2011-511739
[PTL 3] Japanese Translation of PCT International Application Publication No. 2012-529677

SUMMARY OF INVENTION

Technical Problem

In the seats of the aircraft, reclining seats and tables must be returned to their original states during takeoff and landing. The divider must be in a stored state (initial state) during takeoff and landing, and when being used, the divider is slid frontward and abutted against a stopper to create a closed space. The divider adopts an arrangement where the divider is stopped by a stopper having high rigidity so as to satisfy demands regarding strength during collision, but when the divider is used in a normal state, the noise generated by the collision with the stopper having a high rigidity is large, and the noise becomes a problem from the viewpoint of ensuring privacy.

The object of the present invention is to provide a divider unit for seats on an aircraft that solves the above-mentioned problems.

Solution to Problem

In order to achieve the above object, the present invention provides a divider unit for an aircraft passenger seat including
a slide rail fixed to a side shell that surrounds the seat,
a plate-like slider supported by two linear guides inserted in the slide rail, and
stoppers attached to front and rear ends of the slide rail, wherein the slide rail is a member with a C channel-shaped cross section including a slit formed at an upper portion
the linear guide is a downward T-shaped member inserted in the slide rail, and
at least a front end side stopper includes a tapered surface, a height of the tapered surface set so that a front end of the slider rides over the stopper at an end portion of the slide rail, and is increased in height toward a depth side.

Furthermore, the tapered surface of the stopper is configured of a concave-shaped curved surface.

Advantageous Effects of Invention

The present invention having the above-described arrangement enables to satisfy demands regarding strength when closing the divider, by preventing the slider from directly colliding against the stopper and absorbing impact by friction. Further, the present invention enables the divider to be stopped gradually, so that generation of collision noise can be prevented.

DESCRIPTION OF EMBODIMENTS

A preferred embodiment of the present invention will now be described in detail with reference to the drawings.

Figure 1:
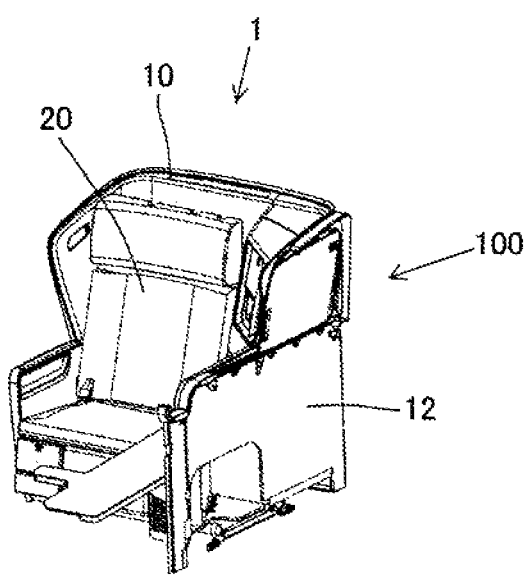
FIG. 1 is a perspective view of a business class seat.

As illustrated in FIG. 1, a passenger seat 1 of an aircraft includes a seat body 20 surrounded by a back shell 10 and a side shell 12, and a divider unit 100 is provided on the side shell 12 placed between a pair of passenger seats 1 arranged adjacent one another.

Figure 2:
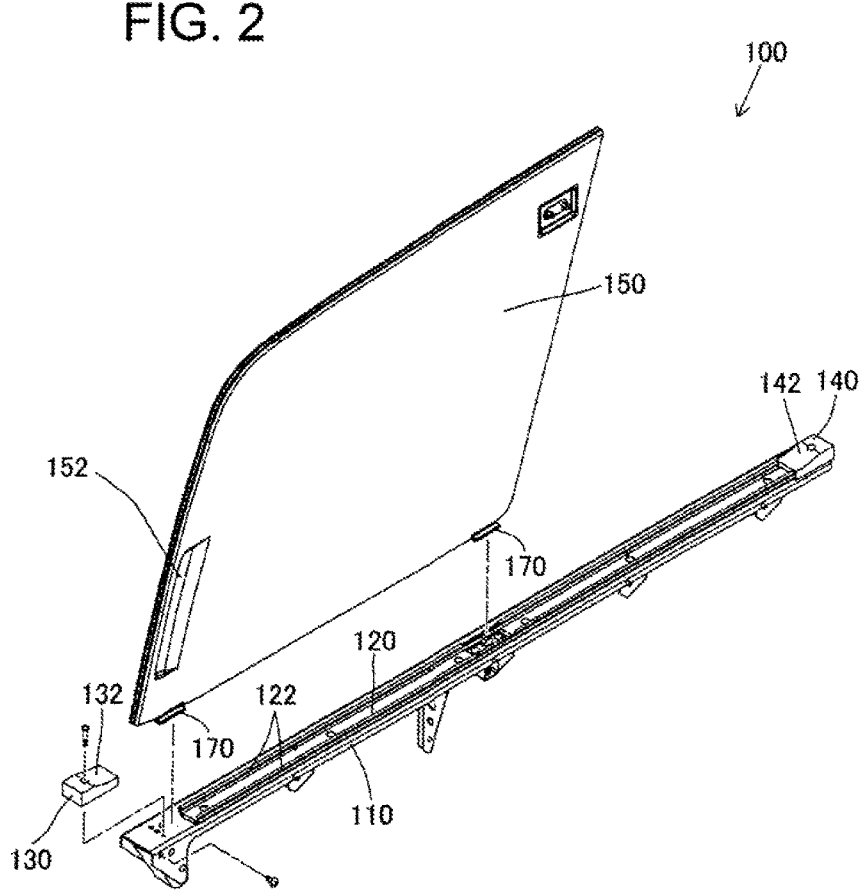
FIG. 2 is a configuration diagram of components of a divider.

FIG. 2 illustrates an arrangement of components of the divider unit 100, wherein a side rail 120 is mounted to an upper surface of a frame 110 fixed onto the side shell 12. The slide rail 120 is a C channel-shaped rail having a groove with an opening formed on the upper portion of the side rail 20, and a flange portion 122 formed on both sides of the groove.

A divider 150 is a plate-like member, having two linear guides 170 that slide within the slide rail 120. The linear guide 170 is a downward T-shaped member, having a guide portion extending to both sides, and inserted in the inner side of the flange portion 122 of the side rail 120.

On the front end and rear end of the side rail 120 are respectively attached a front-end side stopper 130 and a rear-end side stopper 140. An upper surface of the front-end side stopper 130 is formed as a tapered surface 132, and an upper surface of the rear-end side stopper 140 is formed as a tapered surface 142.

Figure 3:
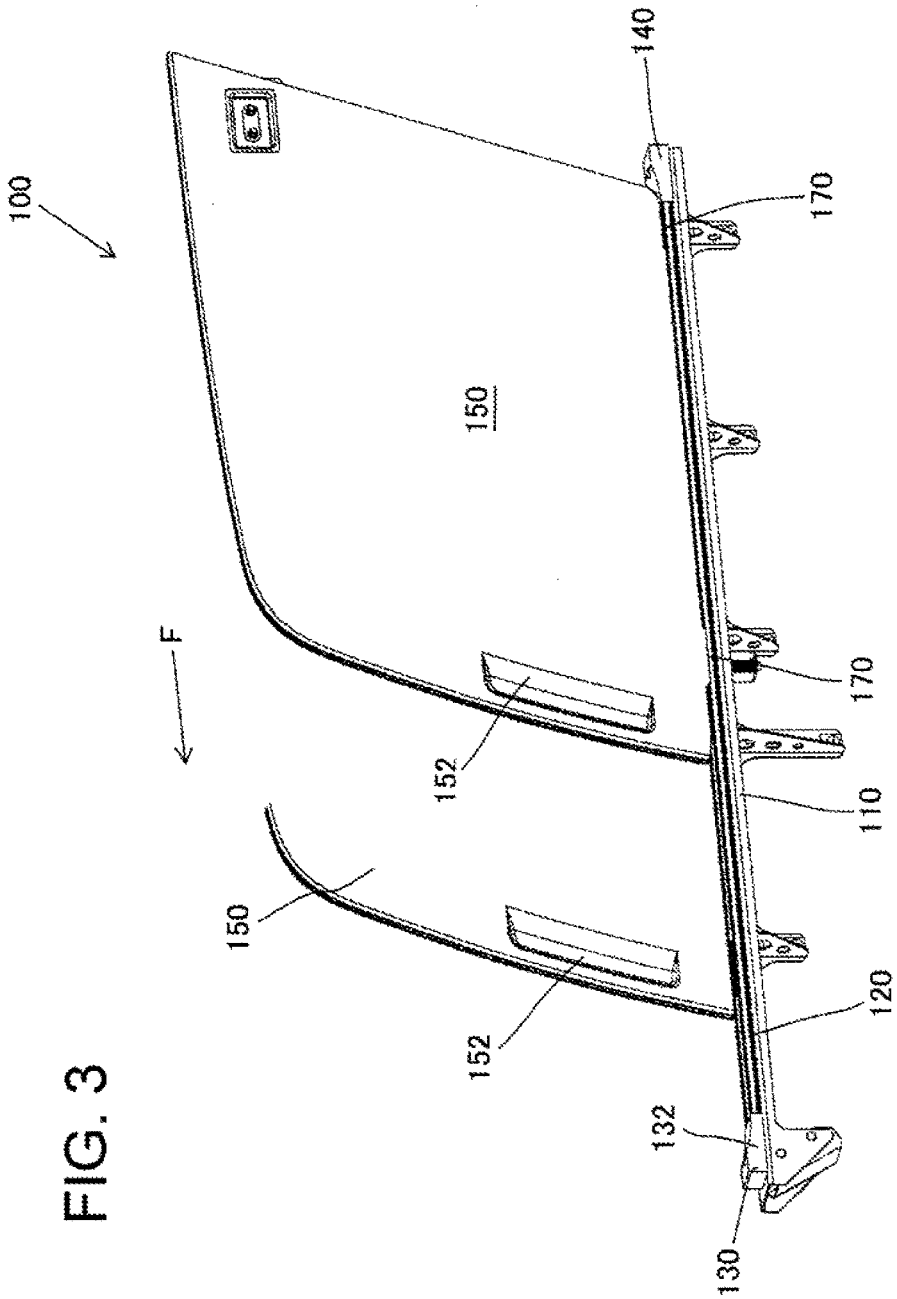
FIG. 3 is an explanatory view of a general arrangement of the divider.

FIG. 3 illustrates a state where a handle 152 of the divider 150 is gripped by a passenger, and the divider is slid in a direction of arrow F.

By pulling out the divider 150 frontward, the space between adjacent seats is partitioned, and privacy of the passengers is enhanced.

Figure 4:
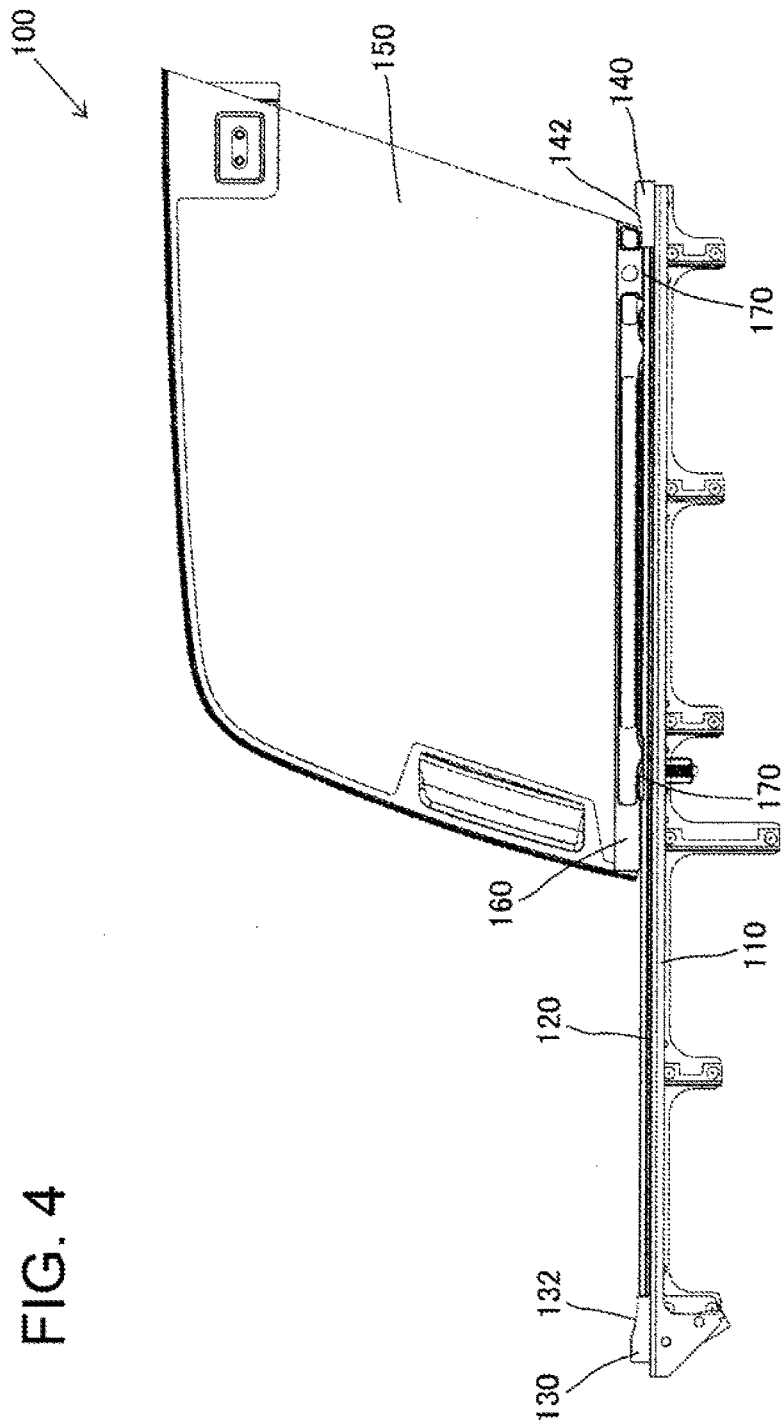
FIG. 4 is an explanatory view of a general arrangement of the divider.

FIG. 4 illustrates an arrangement where a divider frame 160 is arranged at a lower portion of the divider 150.

By attaching the divider frame 160 at a lower portion of the plate-like divider 150, a rigidity of the arrangement can be enhanced.

Figure 5:
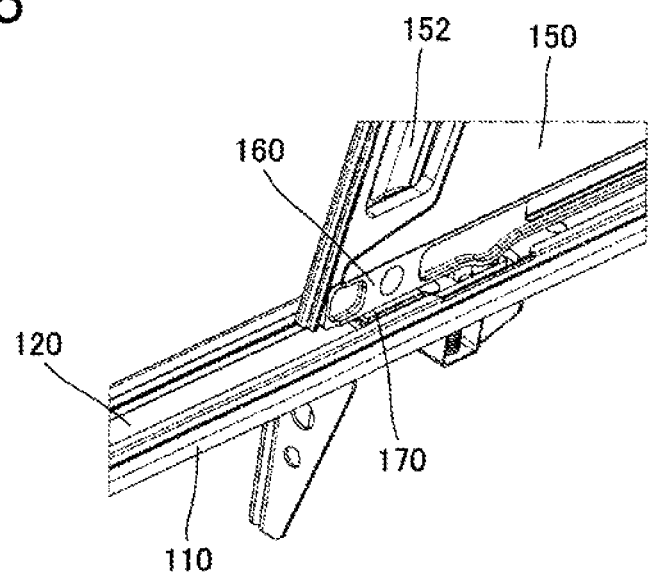
FIG. 5 is an explanatory view of a relevant portion of the divider.

FIG. 5 illustrates a lower portion of a front end of the divider 150 in detail.

The linear guide 170 is fixed onto the lower portion of the divider frame 160.

Figure 6A:
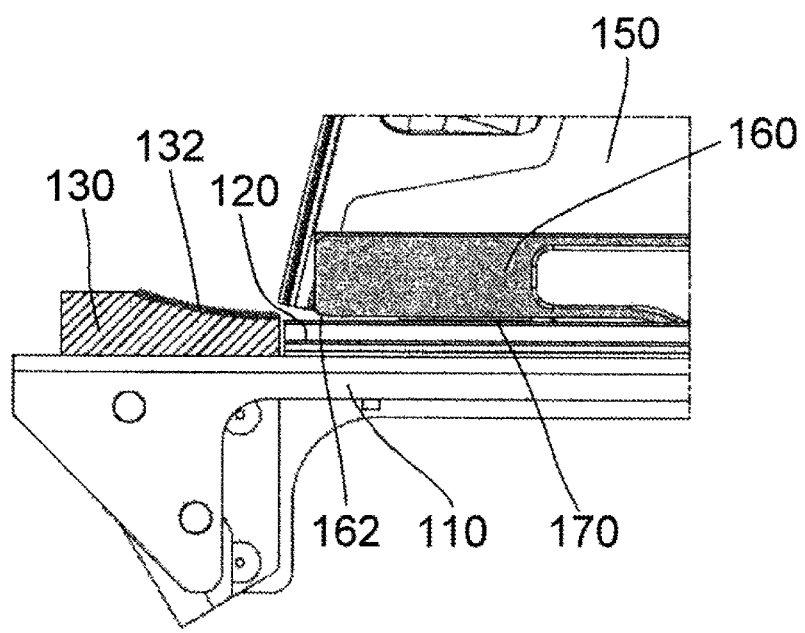
FIG. 6A is an explanatory view of an operation of the divider.
Figure 6B:
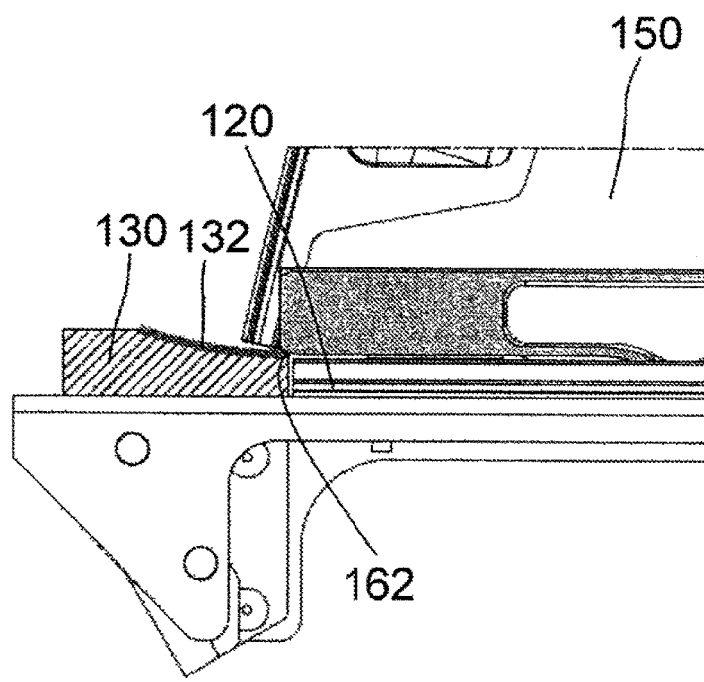
FIG. 6B is an explanatory view of an operation of the divider.
Figure 6C:
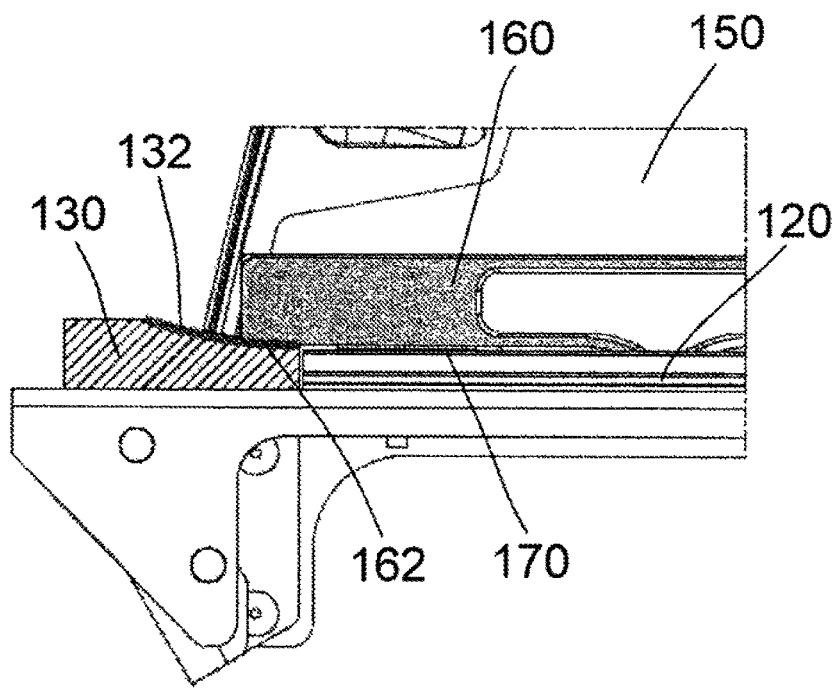
FIG. 6C is an explanatory view of an operation of the divider.

FIGS. 6A to 6C illustrate an operation of sliding the divider 150 in a direction of arrow F and closing the divider 150.

When the divider 150 slides on the side rail 120 and a lower surface 162 of the front end of the divider frame 160 approximates the front-end side stopper 130, since a front end portion of the tapered surface 132 of the front-end side stopper 130 is set at a lower position than the lower surface 162 of the front end of the divider frame 160, the lower surface 162 of the front end of the divider frame 160 rides over the tapered surface 132 of the front-end side stopper 130, as illustrated in FIG. GB.

Since a height position of the tapered surface 132 increases toward the depth direction, the divider frame 160 attempts to be lifted. However, since the linear guide 170 is inserted within the slit of the side rail 120, the linear guide 170 interferes with the flange portion 122 of the side rail 120, and the lifting of the divider frame is restricted.

Therefore, the lower surface 162 of the front end of the divider frame 160 is gradually slowed down by a friction force generated between the tapered surface 132 of the front-end side stopper 130, and the movement of the divider 150 to the forward direction is stopped.

By this operation, the divider frame 160 of the divider 150 and the front-end side stopper 130 are prevented from being stopped by collision, and the occurrence of noise can be prevented.

REFERENCE SIGNS LIST

1 Passenger seat of aircraft
10 Back shell
12 Side shell
20 Seat body
100 Divider unit
110 Fixed frame
120 Slide rail
122 Flange portion
130 Front end side stopper
132 Tapered surface
140 Rear end side stopper
142 Tapered surface
150 Divider
152 Handle
160 Divider frame
162 Lower surface of front end of frame
170 Linear guide

The invention claimed is:

1. A divider unit for an aircraft passenger seat disposed between aircraft passenger seats arranged in parallel and moved in sliding motion, the divider unit comprising:
    a slide rail fixed onto a side shell that surrounds the seat;
    a plate-like slider supported by two linear guides inserted in the slide rail; and
    stoppers attached to front and rear ends of the slide rail,
    wherein the slide rail is a member comprising a C channel-shaped cross section including a slit formed at an upper section,
    the linear guide is a downward T-shaped member inserted in the slide rail, and
    at least a front end side stopper comprises a tapered surface, a height of the tapered surface being set so that a front end of the slider rides over the stopper at an end portion of the slide rail, and being increased in height toward a depth side.

2. The divider unit according to claim 1, wherein the tapered surface of the stopper is configured of a concave-shaped curved surface.

* * * * *